US009999070B2

(12) United States Patent
Yan et al.

(10) Patent No.: US 9,999,070 B2
(45) Date of Patent: Jun. 12, 2018

(54) INFORMATION TRANSMISSION METHOD AND DEVICE

(71) Applicant: Huawei Technologies Co., Ltd., Shenzhen (CN)

(72) Inventors: Zhiyu Yan, Beijing (CN); Sha Ma, Beijing (CN); Qiang Li, Doha (QA)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/274,832

(22) Filed: Sep. 23, 2016

(65) Prior Publication Data

US 2017/0013642 A1 Jan. 12, 2017

Related U.S. Application Data

(63) Continuation of application No. PCT/CN2015/073881, filed on Mar. 9, 2015.

(30) Foreign Application Priority Data

Mar. 25, 2014 (WO) ................ PCT/CN2014/074061

(51) Int. Cl.
*H04W 72/14* (2009.01)
*H04W 72/12* (2009.01)
(Continued)

(52) U.S. Cl.
CPC ........... *H04W 72/14* (2013.01); *H04L 1/1887* (2013.01); *H04L 5/0053* (2013.01);
(Continued)

(58) Field of Classification Search
CPC .. H04W 72/14; H04W 72/1205; H04W 16/14
See application file for complete search history.

(56) References Cited

U.S. PATENT DOCUMENTS 7,961,680 B2 * 6/2011 Park .................... H04L 1/1812
370/229
8,245,092 B2 * 8/2012 Kotecha ............... H04L 1/1812
714/748
(Continued)

FOREIGN PATENT DOCUMENTS

CN 101990242 A 3/2011
CN 102098152 A 6/2011
(Continued)

OTHER PUBLICATIONS

"Retransmission for cross-carrier scheduling." 3GPP TSG-RAN WG1#59bis, Valencia, Spain, R1-100164, pp. 1-2, 3rd Generation Partnership Project, Valbonne, France (Jan. 18-22, 2010).
(Continued)

*Primary Examiner* — Rasheed Gidado
(74) *Attorney, Agent, or Firm* — Leydig, Voit & Mayer, Ltd.

(57) ABSTRACT

The present invention relates to the communications field, and discloses an information transmission method and a device, which can resolve a problem of excessively high overheads of scheduling signaling of data retransmission in an unlicensed spectrum. A specific solution is as follows: writing a data retransmission identifier of a first carrier into a preset field of a physical downlink control channel; generating a data scheduling instruction of the physical downlink control channel; sending, on a second carrier, the data scheduling instruction of the physical downlink control channel to a receiving device; and sending data that is on the first carrier on the second carrier according to the data scheduling instruction of the physical downlink control channel. The present invention is applied to information transmission.

16 Claims, 4 Drawing Sheets (51) Int. Cl.
*H04L 1/18* (2006.01)
*H04W 16/14* (2009.01)
*H04W 72/04* (2009.01)
*H04L 5/00* (2006.01)

(52) U.S. Cl.
CPC ....... *H04L 5/0096* (2013.01); *H04W 72/1205* (2013.01); *H04L 5/001* (2013.01); *H04L 5/003* (2013.01); *H04L 5/0044* (2013.01); *H04W 16/14* (2013.01); *H04W 72/042* (2013.01)

(56) References Cited

U.S. PATENT DOCUMENTS

| | | | | |
|---|---|---|---|---|
| 8,630,248 B2* | 1/2014 | Seo | ............. | H04L 1/1812 370/329 |
| 8,718,002 B2* | 5/2014 | Kim | ............. | H04W 72/0453 370/329 |
| 9,166,747 B2* | 10/2015 | Moon | ............. | H04L 1/1861 |
| 9,622,221 B2* | 4/2017 | Lee | ............. | H04W 72/0406 |
| 2014/0029537 A1 | 1/2014 | Golitschek et al. | | |
| 2016/0323854 A1* | 11/2016 | Gao | ............. | H04L 1/1822 |

FOREIGN PATENT DOCUMENTS

| | | |
|---|---|---|
| CN | 102710398 A | 10/2012 |
| CN | 103548407 A | 1/2014 |
| EP | 2200208 A1 | 6/2010 |
| WO | 2012126577 A1 | 9/2012 |
| WO | WO 2013087835 A1 | 6/2013 |

OTHER PUBLICATIONS

Ratasuk et al., "License-Exempt LTE Deployment in Heterogeneous Network," IEEE Wireless Communication Systems, XP32263759A, pp. 246-251, Institute of Electrical and Electronics Engineers, New York, New York (2012).

* cited by examiner

INFORMATION TRANSMISSION METHOD AND DEVICE

CROSS-REFERENCE TO RELATED APPLICATIONS

This application is a continuation of International Application No. PCT/CN2015/073881, filed on Mar. 9, 2015, which claims priority to International Application No. PCT/CN2014/074061, filed on Mar. 25, 2014. The disclosures of the aforementioned applications are hereby incorporated by reference in their entireties.

TECHNICAL FIELD

The present invention relates to the communications field, and in particular, to an information transmission method and a device.

BACKGROUND

In a current wireless network system, to reduce interference between different wireless technologies, national and governmental agencies allocate some spectrums to specified agencies to provide services. Specified and allocated spectrums are referred to as licensed spectrums, and unspecified and unallocated spectrums are referred to as unlicensed spectrums. With development of communications technologies, to better meet requirements for mobile broadband services, unlicensed spectrum resources start to be used to perform data transmission.

There is a time limit on data transmission performed in an unlicensed spectrum, and after a time during which a device occupies a channel in the unlicensed spectrum reaches a maximum limit, the occupied unlicensed spectrum needs to be released for a period of time. Before the device occupies the channel in the unlicensed spectrum next time, the device needs to listen on the channel to determine whether the channel is idle.

In an HARQ (Hybrid Automatic Repeat Request) technology, by means of flexible mapping between carriers, cross-carrier retransmission of data is implemented, which can resolve a problem caused when a device does not complete data transmission in an unlicensed spectrum within a regulated occupation time. For example, data transmitted on a carrier A is not completed in the unlicensed spectrum within the regulated time, the data transmitted on the carrier A is retransmitted on a carrier B. However, in the prior art, a dedicated field is added to downlink data scheduling signaling to instruct to retransmit data, which increases overheads of downlink scheduling signaling.

SUMMARY

Embodiments of the present invention provide an information transmission method and a device, which can resolve a problem of excessively high overheads of scheduling signaling of data retransmission in an unlicensed spectrum.

To achieve the foregoing objective, the following technical solutions are used in the embodiments of the present invention:

According to a first aspect, a network device is provided, where the network device is applied to data transmission in a preset spectrum, the preset spectrum is a spectrum that occupies a spectrum resource for a limited time each time, and the network device includes:

a control unit, configured to write a data retransmission identifier of a first carrier into a preset field of a physical downlink control channel, where the preset field includes one or more of a carrier indicator CIF field, a new data indicator NDI field, and a resource block assignment RBA field, and the first carrier is a carrier in the preset spectrum; where the control unit is further configured to generate a data scheduling instruction of the physical downlink control channel, where the data scheduling instruction of the physical downlink control channel is used to instruct to retransmit data that is on the first carrier; and a sending unit, configured to send, on a second carrier, the data scheduling instruction of the physical downlink control channel generated by the control unit to a receiving device; where the sending unit is further configured to send the data that is on the first carrier on the second carrier according to the data scheduling instruction of the physical downlink control channel.

With reference to the first aspect, in a first possible implementation manner, the control unit is specifically configured to: when the preset field includes the CIF field, use a first index number of the first carrier as the data retransmission identifier of the first carrier and write the first index number of the first carrier into the CIF field, where the first index number of the first carrier is used to instruct to retransmit the data of the first carrier on the second carrier.

With reference to the first aspect, in a second possible implementation manner, the control unit is specifically configured to: when the preset field includes the NDI field, use a non-new data identifier as the data retransmission identifier of the first carrier and write the non-new data identifier into the NDI field, where the non-new data identifier is used to instruct to retransmit the data of the first carrier on the second carrier.

With reference to the first aspect, in a third possible implementation manner, the control unit is specifically configured to: when the preset field includes the RBA field, use a preset quantity of resource blocks as the data retransmission identifier of the first carrier and write the preset quantity of resource blocks into the RBA field, where the preset quantity of resource blocks is used to instruct to retransmit the data of the first carrier on the second carrier.

According to a second aspect, a receiving device is provided, where the receiving device is applied to data transmission in a preset spectrum, the preset spectrum is a spectrum that occupies a spectrum resource for a limited time each time, and the receiving device includes:

a receiving unit, configured to receive a data scheduling instruction, which is sent by a network device, of a physical downlink control channel, where the data scheduling instruction of the physical downlink control channel includes a preset field, and the preset field includes one or more of a carrier indicator CIF field, a new data indicator NDI field, and a resource block assignment RBA field; and a judgment unit, configured to obtain a data retransmission identifier of a first carrier and determine whether the preset field includes the data retransmission identifier of the first carrier; where the receiving unit is further configured to: when a determining result of the judgment unit is that the preset field includes the data retransmission identifier of the first carrier, receive data that is on the first carrier on a second carrier according to the data retransmission identifier of the first carrier.

With reference to the second aspect, in a first possible implementation manner, the judgment unit is specifically configured to: when the preset field includes the CIF field, determine whether the CIF field includes a first index number of the first carrier; and the receiving unit is specifically configured to: when a determining result of the judgment unit is that the CIF field includes the first index number of the first carrier, receive the data that is on the first carrier on the second carrier according to the first index number of the first carrier.

With reference to the second aspect, in a second possible implementation manner, the judgment unit is specifically configured to: when the preset field includes the NDI field, determine whether the NDI field includes a non-new data identifier; and the receiving unit is specifically configured to: when a determining result of the judgment unit is that the NDI field includes the non-new data identifier, receive the data that is on the first carrier on the second carrier according to the non-new data identifier.

With reference to the second aspect, in a third possible implementation manner, the judgment unit is specifically configured to: when the preset field includes the RBA field, determine whether the RBA field includes a preset quantity of resource blocks; and the receiving unit is specifically configured to: when a determining result of the judgment unit is that the RBA field includes the preset quantity of resource blocks, receive the data that is on the first carrier on the second carrier according to the preset quantity of resource blocks.

According to a third aspect, a network device is provided, where the network device is applied to data transmission in a preset spectrum, the preset spectrum is a spectrum that occupies a spectrum resource for a limited time each time, and the network device includes: a processor, a memory, a bus, and a transmitter, where the processor, the memory, and the transmitter are connected to each other by using the bus;

the processor is configured to write a data retransmission identifier of a first carrier into a preset field of a physical downlink control channel, where the preset field includes one or more of a carrier indicator CIF field, a new data indicator NDI field, and a resource block assignment RBA field, and the first carrier is a carrier in the preset spectrum;

the processor is further configured to generate a data scheduling instruction of the physical downlink control channel, where the data scheduling instruction of the physical downlink control channel is used to instruct to retransmit data that is on the first carrier;

the transmitter is configured to send, on a second carrier, the data scheduling instruction of the physical downlink control channel to a receiving device; and the transmitter is further configured to send the data that is on the first carrier on the second carrier according to the data scheduling instruction of the physical downlink control channel.

With reference to the third aspect, in a first possible implementation manner, the processor is specifically configured to: when the preset field includes the CIF field, use a first index number of the first carrier as the data retransmission identifier of the first carrier and write the first index number of the first carrier into the CIF field, where the first index number of the first carrier is used to instruct to retransmit the data of the first carrier on the second carrier.

With reference to the third aspect, in a second possible implementation manner, the processor is specifically configured to: when the preset field includes the NDI field, use a non-new data identifier as the data retransmission identifier of the first carrier and write the non-new data identifier into the NDI field, where the non-new data identifier is used to instruct to retransmit the data of the first carrier on the second carrier.

With reference to the third aspect, in a third possible implementation manner, the processor is specifically configured to: when the preset field includes the RBA field, use a preset quantity of resource blocks as the data retransmission identifier of the first carrier and write the preset quantity of resource blocks into the RBA field, where the preset quantity of resource blocks is used to instruct to retransmit the data of the first carrier on the second carrier.

According to a fourth aspect, a receiving device is provided, where the receiving device is applied to data transmission in a preset spectrum, the preset spectrum is a spectrum that occupies a spectrum resource for a limited time each time, and the receiving device includes: a processor, a memory, a bus, and a receiver, where the processor, the memory, and the receiver are connected to each other by using the bus;

the receiver is configured to receive a data scheduling instruction, which is sent by a network device, of a physical downlink control channel, where the data scheduling instruction of the physical downlink control channel includes a preset field, and the preset field includes one or more of a carrier indicator CIF field, a new data indicator NDI field, and a resource block assignment RBA field;

the processor is configured to obtain a data retransmission identifier of a first carrier and determine whether the preset field includes the data retransmission identifier of the first carrier; and the receiver is further configured to: when a determining result of the processor is that the preset field includes the data retransmission identifier of the first carrier, receive data that is on the first carrier on a second carrier according to the data retransmission identifier of the first carrier.

With reference to the fourth aspect, in a first possible implementation manner, the processor is specifically configured to: when the preset field includes the CIF field, determine whether the CIF field includes a first index number of the first carrier; and the receiver is specifically configured to: when a determining result of the processor is that the CIF field includes the first index number of the first carrier, receive the data that is on the first carrier on the second carrier according to the first index number of the first carrier.

With reference to the fourth aspect, in a second possible implementation manner, the processor is specifically configured to: when the preset field includes the NDI field, determine whether the NDI field includes a non-new data identifier; and the receiver is specifically configured to: when a determining result of the processor is that the NDI field includes the non-new data identifier, receive the data that is on the first carrier on the second carrier according to the non-new data identifier.

With reference to the fourth aspect, in a third possible implementation manner, the processor is specifically configured to: when the preset field includes the RBA field, determine whether the RBA field includes a preset quantity of resource blocks; and the receiver is specifically configured to: when a determining result of the processor is that the RBA field includes the preset quantity of resource blocks, receive the data that is on the first carrier on the second carrier according to the preset quantity of resource blocks.

According to a fifth aspect, an information transmission method is provided, where the information transmission method is applied to data transmission by a network device in a preset spectrum, the preset spectrum is a spectrum that occupies a spectrum resource for a limited time each time, and the information transmission method includes:

writing, by the network device, a data retransmission identifier of a first carrier into a preset field of a physical downlink control channel, where the preset field includes one or more of a carrier indicator CIF field, a new data indicator NDI field, and a resource block assignment RBA field, and the first carrier is a carrier in the preset spectrum;

generating, by the network device, a data scheduling instruction of the physical downlink control channel, where the data scheduling instruction of the physical downlink control channel is used to instruct to retransmit data that is on the first carrier;

sending, by the network device on a second carrier, the data scheduling instruction of the physical downlink control channel to a receiving device; and sending, by the network device, the data that is on the first carrier on the second carrier according to the data scheduling instruction of the physical downlink control channel.

With reference to the fifth aspect, in a first possible implementation manner, the preset field includes the CIF field; and the writing, by the network device, a data retransmission identifier of a first carrier into a preset field of a physical downlink control channel includes:

using, by the network device, a first index number of the first carrier as the data retransmission identifier of the first carrier and writing the first index number of the first carrier into the CIF field, where the first index number of the first carrier is used to instruct to retransmit the data of the first carrier on the second carrier.

With reference to the fifth aspect, in a second possible implementation manner, the preset field includes the NDI field; and the writing, by the network device, a data retransmission identifier of a first carrier into a preset field of a physical downlink control channel includes:

using, by the network device, a non-new data identifier as the data retransmission identifier of the first carrier and writing the non-new data identifier into the NDI field, where the non-new data identifier is used to instruct to retransmit the data of the first carrier on the second carrier.

With reference to the fifth aspect, in a third possible implementation manner, the preset field includes the RBA field; and the writing, by the network device, a data retransmission identifier of a first carrier into a preset field of a physical downlink control channel includes:

using, by the network device, a preset quantity of resource blocks as the data retransmission identifier of the first carrier and writing the preset quantity of resource blocks into the RBA field, where the preset quantity of resource blocks is used to instruct to retransmit the data of the first carrier on the second carrier.

According to a sixth aspect, an information transmission method is provided, where the information transmission method is applied to data transmission by a receiving device in a preset spectrum, the preset spectrum is a spectrum that occupies a spectrum resource for a limited time each time, and the information transmission method includes:

receiving, by the receiving device, a data scheduling instruction, which is sent by the network device, of a physical downlink control channel, where the data scheduling instruction of the physical downlink control channel includes a preset field, and the preset field includes one or more of a carrier indicator CIF field, a new data indicator NDI field, and a resource block assignment RBA field;

obtaining, by the receiving device, a data retransmission identifier of a first carrier and determining whether the preset field includes the data retransmission identifier of the first carrier; and receiving, by the receiving device, data that is on the first carrier on a second carrier according to the data retransmission identifier of the first carrier if the preset field includes the data retransmission identifier of the first carrier.

With reference to the sixth aspect, in a first possible implementation manner, the preset field includes the CIF field; and the determining, by the receiving device, whether the preset field includes the data retransmission identifier of the first carrier includes:

determining, by the receiving device, whether the CIF field includes a first index number of the first carrier; and the receiving, by the receiving device, data that is on the first carrier on a second carrier according to the data retransmission identifier of the first carrier if the preset field includes the data retransmission identifier of the first carrier includes:

if the CIF field includes the first index number of the first carrier, receiving, by the receiving device, the data that is on the first carrier on the second carrier according to the first index number of the first carrier.

With reference to the sixth aspect, in a second possible implementation manner, the preset field includes the NDI field;

the determining, by the receiving device, whether the preset field includes the data retransmission identifier of the first carrier includes:

determining, by the receiving device, whether the NDI field includes a non-new data identifier; and the receiving, by the receiving device, data that is on the first carrier on a second carrier according to the data retransmission identifier of the first carrier if the preset field includes the data retransmission identifier of the first carrier includes:

if the NDI field includes the non-new data identifier, receiving, by the receiving device, the data that is on the first carrier on the second carrier according to the non-new data identifier.

With reference to the sixth aspect, in a third possible implementation manner, the preset field includes the RBA field;

the determining, by the receiving device, whether the preset field includes the data retransmission identifier of the first carrier includes:

determining, by the receiving device, whether the RBA field includes a preset quantity of resource blocks; and the receiving, by the receiving device, data that is on the first carrier on a second carrier according to the data retransmission identifier of the first carrier if the preset field includes the data retransmission identifier of the first carrier includes:

if the RBA field includes the preset quantity of resource blocks, receiving, by the receiving device, the data that is on the first carrier on the second carrier according to the preset quantity of resource blocks.

According to the information transmission method and the device provided in the embodiments of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
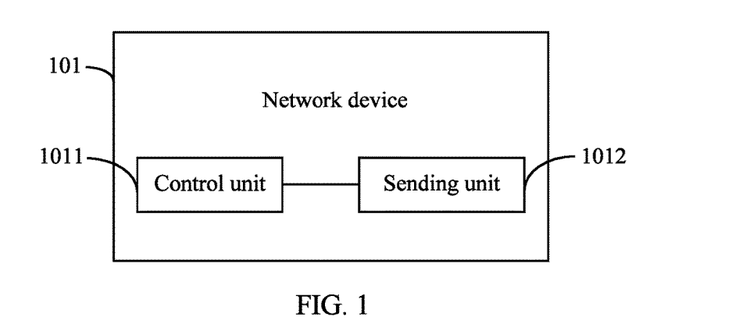
FIG. 1 is a schematic structural diagram of a network device according to an embodiment of the present invention.

An embodiment of the present invention provides a network device, where the network device is applied to data transmission in a preset spectrum, and the preset spectrum is a spectrum that occupies a spectrum resource for a limited time each time. Referring to FIG. 1, the network device 101 includes a control unit 1011 and a sending unit 1012.

The control unit 1011 is configured to write a data retransmission identifier of a first carrier into a preset field of a physical downlink control channel, where the preset field includes one or more of a CIF (Carrier Indicator) field, an NDI (New Data Indicator) field, and an RBA (Resource Block Assignment) field, and the first carrier is a carrier in the preset spectrum.

The control unit 1011 is further configured to generate a data scheduling instruction of the physical downlink control channel, where the data scheduling instruction of the physical downlink control channel is used to instruct to retransmit data that is on the first carrier.

The sending unit 1012 is configured to send, on a second carrier, the data scheduling instruction of the physical downlink control channel generated by the control unit 1011 to a receiving device.

The sending unit 1012 is further configured to send the data that is on the first carrier on the second carrier according to the data scheduling instruction of the physical downlink control channel.

Further, the network device 101 may further include:

a determining unit 1013, configured to determine, if the preset field includes the CIF field, whether a resource of the first carrier may be occupied to send data.

The sending unit 1012 is configured to: when a determining result of the determining unit 1013 is no, send the preset field CIF by using a physical downlink control channel of a second carrier. It should be especially noted that, downlink control information that the CIF is a first index number of the first carrier is merely an example in the present invention, and the present invention includes, but is not limited to, the example. Alternatively, when a determining result of the determining unit 1013 is yes, the network device does not send downlink control information that the preset field CIF is a first index number of the first carrier by using a physical downlink control channel of a second carrier.

The determining unit 1013 is further configured to determine, if the preset field includes the CIF field, whether a resource of the second carrier may be occupied to send data.

The sending unit 1012 is configured to: when a determining result of the determining unit 1013 is yes, send the preset field CIF by using a physical downlink control channel of a second carrier. It should be especially noted that, downlink control information that the CIF may be a first index number of the first carrier is merely an example in the present invention, and the present invention includes, but is not limited to, the example. Alternatively, the sending unit 1012 is configured to: when a determining result of the determining unit 1013 is no, skip sending downlink control information that the preset field CIF is a first index number of the first carrier by using a physical downlink control channel of a second carrier.

According to the network device provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Optionally, in a first application scenario, the preset field includes the CIF field, and the control unit 1011 is specifically configured to use the first index number of the first carrier as the data retransmission identifier of the first carrier and write the first index number of the first carrier into the CIF field, where the first index number of the first carrier is used to instruct to retransmit the data of the first carrier on the second carrier.

Optionally, in a second application scenario, the preset field includes the NDI field, and the control unit 1011 is specifically configured to use a non-new data identifier as the data retransmission identifier of the first carrier and write the non-new data identifier into the NDI field, where the non-new data identifier is used to instruct to retransmit the data of the first carrier on the second carrier.

Optionally, in a third application scenario, the preset field includes the RBA field, and the control unit 1011 is specifically configured to use a preset quantity of resource blocks as the data retransmission identifier of the first carrier and write the preset quantity of resource blocks into the RBA field, where the preset quantity of resource blocks is used to instruct to retransmit the data of the first carrier on the second carrier.

According to the network device provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Figure 2:
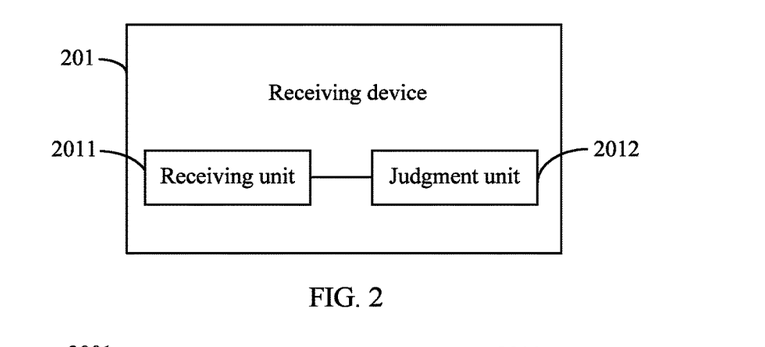
FIG. 2 is a schematic structural diagram of a receiving device according to an embodiment of the present invention.

Referring to the embodiment corresponding to FIG. 1, an embodiment of the present invention provides a receiving device, which corresponds to the network device described in the embodiment corresponding to FIG. 1 and applied to data transmission in a preset spectrum. The preset spectrum is a spectrum that occupies a spectrum resource for a limited time each time. Referring to FIG. 2, the receiving device 201 includes a receiving unit 2011 and a judgment unit 2012.

The receiving unit 2011 is configured to receive a data scheduling instruction, which is sent by a network device, of a physical downlink control channel, where the data scheduling instruction of the physical downlink control channel includes a preset field, and the preset field includes one or more of a CIF field, an NDI field, and an RBA field.

The judgment unit 2012 is configured to obtain a data retransmission identifier of a first carrier, and determine whether the preset field includes the data retransmission identifier of the first carrier.

The receiving unit 2011 is further configured to: when a determining result of the judgment unit 2012 is that the preset field includes the data retransmission identifier of the first carrier, receive data that is on the first carrier on a second carrier according to the data retransmission identifier of the first carrier.

According to the receiving device provided in this embodiment of the present invention, a data scheduling instruction, which is sent by a network device, of a physical downlink control channel is received, whether a preset field includes a data retransmission identifier of a first carrier is determined, and data that is on the first carrier is received on a second carrier according to the data retransmission identifier of the first carrier if the preset field includes the data retransmission identifier of the first carrier, which resolves a problem of excessively high overheads of scheduling signaling of data retransmission in an unlicensed spectrum.

Optionally, in a first application scenario, the preset field includes the CIF field, and the judgment unit 2012 is specifically configured to determine whether the CIF field includes a first index number of the first carrier.

The receiving unit 2011 is specifically configured to: when a determining result of the judgment unit 2012 is that the CIF field includes the first index number of the first carrier, receive the data that is on the first carrier on the second carrier according to the first index number of the first carrier.

The receiving device 201 further includes a determining unit 2013, which is specifically configured to determine, if the preset field includes the CIF field, whether the network device may occupy a resource of the first carrier to send data.

The receiving unit 2011 is configured to: when a determining result of the determining unit 2013 is no, receive and detect a scheduling instruction about whether the preset field CIF is sent by using a downlink control channel of the second carrier, where the CIF may be the first index number of the first carrier; or is configured to: when a determining result of the determining unit 2013 is yes, skip receiving a scheduling instruction about whether the preset field CIF is sent by using a downlink control channel of the second carrier, where the CIF is the first index number of the first carrier, and instead, receive and detect scheduling instruction information that is on the first carrier and that is used by the network device to schedule the first carrier to transmit first carrier data to a user device.

The determining unit 2013 is configured to determine, if the preset field includes the CIF field, whether the network device may occupy a resource of the first carrier to send data.

The receiving unit 2011 is configured to: when a determining result of the determining unit 2013 is yes, receive and detect a scheduling instruction about whether the preset field CIF is sent by using a downlink control channel of the second carrier, where the CIF is the first index number of the first carrier; or is configured to: when a determining result of the determining unit 2013 is no, skip receiving a scheduling instruction about whether the preset field CIF is sent by using a downlink control channel of the second carrier, where the CIF is the first index number of the first carrier.

Optionally, in a second application scenario, the preset field includes the NDI field, and the judgment unit 2012 is specifically configured to determine whether the NDI field includes a non-new data identifier.

The receiving unit 2011 is specifically configured to: when a determining result of the judgment unit 2012 is that the NDI field includes the non-new data identifier, receive the data that is on the first carrier on the second carrier according to the non-new data identifier.

Optionally, in a third application scenario, the preset field includes the RBA field, and the judgment unit 2012 is specifically configured to determine whether the RBA field includes a preset quantity of resource blocks.

The receiving unit 2011 is specifically configured to: when a determining result of the judgment unit 2012 is that the RBA field includes the preset quantity of resource blocks, receive the data that is on the first carrier on the second carrier according to the preset quantity of resource blocks.

According to the receiving device provided in this embodiment of the present invention, a data scheduling instruction, which is sent by a network device, of a physical downlink control channel is received, whether a preset field includes a data retransmission identifier of a first carrier is determined, and data that is on the first carrier is received on a second carrier according to the data retransmission identifier of the first carrier if the preset field includes the data retransmission identifier of the first carrier, which resolves a problem of excessively high overheads of scheduling signaling of data retransmission in an unlicensed spectrum.

Figure 3:
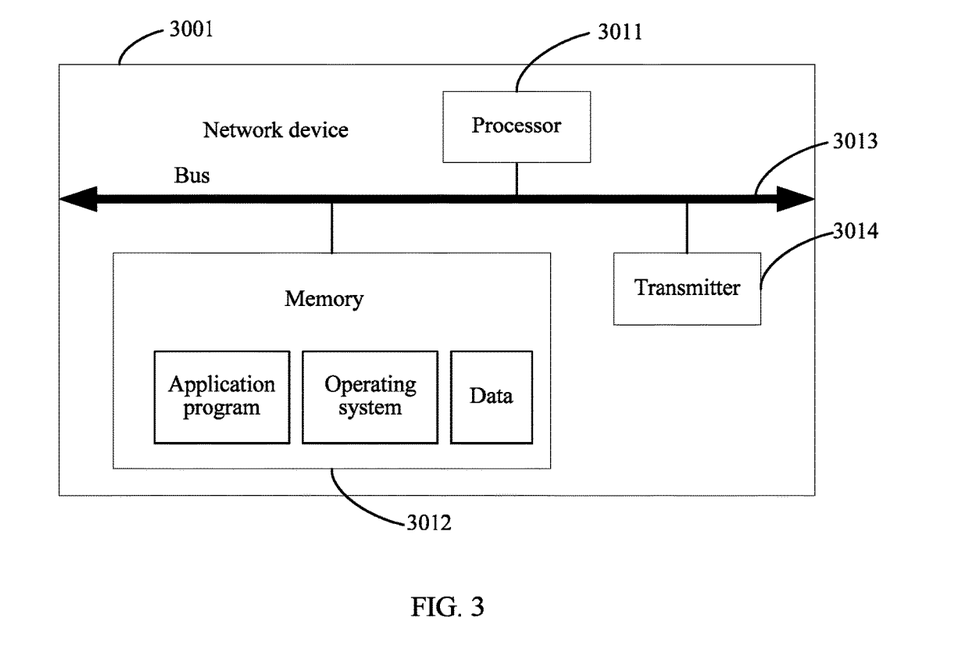
FIG. 3 is a schematic structural diagram of another network device according to an embodiment of the present invention.

An embodiment of the present invention provides another network device 3001. Referring to FIG. 3, the device may be built in micro computer processing or may be micro computer processing, for example, a portable device such as a general-purpose computer, a customized machine, a mobile phone terminal, or a tablet computer. The network device 3001 includes: at least one processor 3011, a memory 3012, a bus 3013, and a transmitter 3014. The at least one processor 3011, the memory 3012, and the transmitter 3014 are connected to and communicate with each other by using the bus 3013.

The bus 3013 may be an ISA (Industry Standard Architecture) bus, a PCI (Peripheral Component Interconnect) bus, an EISA (Extended Industry Standard Architecture) bus, or the like. The bus 3013 may be classified into an address bus, a data bus, a control bus, and the like. For ease of illustration, the bus in FIG. 3 is represented by using only one bold line, but it does not mean that there is only one bus or one type of bus.

The memory 3012 is configured to execute application program code of a solution in the present invention, where the application program code for executing the solution in the present invention is stored in the memory, and execution of the application program code is controlled by the processor 3011.

The memory may be a read-only memory ROM or another type of static storage device that can store static information and an instruction, or a random access memory RAM or another type of dynamic storage device that can store information and an instruction, and may also be an electrically erasable programmable read-only memory EEPROM, a compact disc read-only memory CD-ROM or other optical disk memory, optical disc memory (including a compact disc, a laser disc, an optical disc, a digital versatile disc, a Blu-ray disc, and the like), a magnetic disk memory medium or another magnetic storage device, or any other medium that can carry or store expected program code in a form of an instruction or a data structure and can be accessed by a computer, but the present invention is not limited thereto. These memories are connected to the processor by using the bus.

The processor 3011 may be a central processing unit 3011 (Central Processing Unit, CPU for short) or an application-specific integrated circuit (Application-Specific Integrated Circuit, ASIC for short), or is configured as one or more integrated circuits that implement the embodiment of the present invention.

The processor 3011 is configured to invoke the program code in the memory 3012. In a possible implementation manner, when the foregoing application program is executed by the processor 3011, the following functions are implemented.

The processor 3011 is configured to write a data retransmission identifier of a first carrier into a preset field of a physical downlink control channel, where the preset field includes one or more of a CIF field, an NDI field, and an RBA field, where the first carrier is a carrier in the preset spectrum.

The processor 3011 is further configured to generate a data scheduling instruction of the physical downlink control channel, where the data scheduling instruction of the physical downlink control channel is used to instruct to retransmit data that is on the first carrier.

The transmitter 3014 is configured to send, on a second carrier, the data scheduling instruction of the physical downlink control channel to a receiving device.

The transmitter 3014 is further configured to send the data that is on the first carrier on the second carrier according to the data scheduling instruction of the physical downlink control channel.

According to the network device provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Optionally, in a first application scenario, the preset field includes the CIF field, and the processor 3011 is specifically configured to use a first index number of the first carrier as the data retransmission identifier of the first carrier and write the first index number of the first carrier into the CIF field, where the first index number of the first carrier is used to instruct to retransmit the data of the first carrier on the second carrier.

Optionally, the processor 3011 is specifically configured to:

if the preset field includes the CIF field, determine whether a resource of the first carrier may be occupied to send data. If not, the transmitter 3014 sends the preset field CIF by using the physical downlink control channel of the second carrier. It should be especially noted that, downlink control information that the CIF is the first index number of the first carrier is merely an example in the present invention, and the present invention includes, but is not limited to, the example. Alternatively, if yes, the transmitter 3014 does not send downlink control information that the preset field CIF is the first index number of the first carrier by using the physical downlink control channel of the second carrier.

The processor 3011 is specifically configured to: if the preset field includes the CIF field, determine whether a resource of the second carrier may be occupied to send data. If yes, the transmitter 3014 sends the preset field CIF by using the physical downlink control channel of the second carrier. It should be especially noted that, downlink control information that the CIF may be the first index number of the first carrier is merely an example in the present invention, and the present invention includes, but is not limited to, the example. Alternatively, if not, the transmitter 3014 does not send downlink control information that the preset field CIF is the first index number of the first carrier by using the physical downlink control channel of the second carrier.

Optionally, in a second application scenario, the preset field includes the NDI field, and the processor 3011 is specifically configured to use a non-new data identifier as the data retransmission identifier of the first carrier and write the non-new data identifier into the NDI field, where the non-new data identifier is used to instruct to retransmit the data of the first carrier on the second carrier.

Optionally, in a third application scenario, the preset field includes the RBA field, and the processor 3011 is specifically configured to use a preset quantity of resource blocks as the data retransmission identifier of the first carrier and write the preset quantity of resource blocks into the RBA field, where the preset quantity of resource blocks is used to instruct to retransmit the data of the first carrier on the second carrier.

According to the network device provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Figure 4:
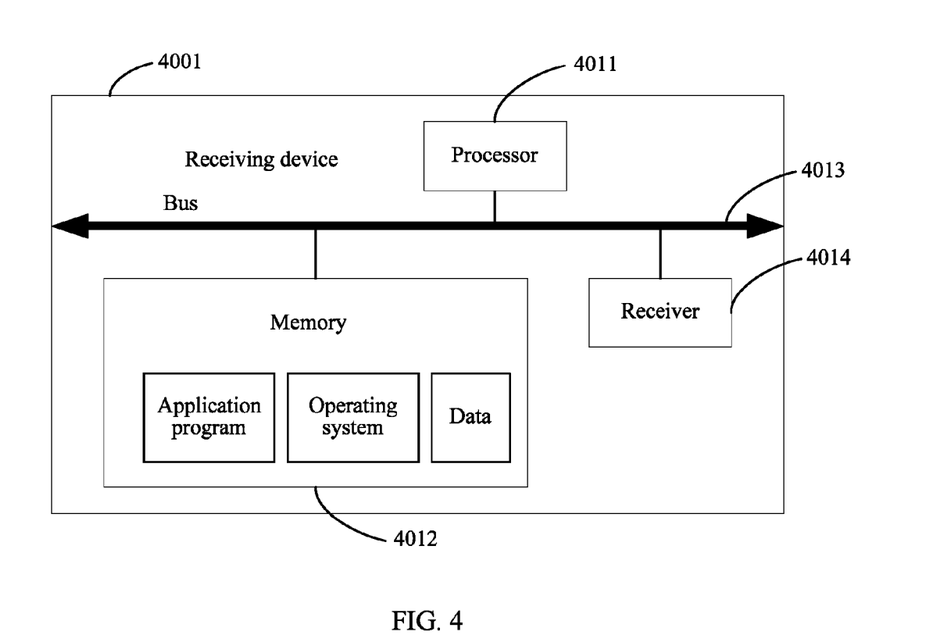
FIG. 4 is a schematic structural diagram of another receiving device according to an embodiment of the present invention.

An embodiment of the present invention provides another receiving device 4001. Referring to FIG. 4, the device may be built in micro computer processing or may be micro computer processing, for example, a portable device such as a general-purpose computer, a customized machine, a mobile phone terminal, or a tablet computer. The receiving device 4001 includes: at least one processor 4011, a memory 4012, a bus 4013, and a receiver 4014. The at least one processor 4011, the memory 4012, and the receiver 4014 are connected to and communicate with each other by using the bus 4013.

The bus 4013 may be an ISA (Industry Standard Architecture) bus, a PCI (Peripheral Component Interconnect) bus, an EISA (Extended Industry Standard Architecture) bus, or the like. The bus 4013 may be classified into an address bus, a data bus, a control bus, and the like. For ease of illustration, the bus in FIG. 4 is represented by using only one bold line, but it does not mean that there is only one bus or one type of bus.

The memory 4012 is configured to execute application program code of a solution in the present invention, where the application program code for executing the solution in the present invention is stored in the memory, and execution of the application program code is controlled by the processor 4011.

The memory may be a read-only memory ROM or another type of static storage device that can store static information and an instruction, or a random access memory RAM or another type of dynamic storage device that can store information and an instruction, and may also be an electrically erasable programmable read-only memory EEPROM, a compact disc read-only memory CD-ROM or other optical disk memory, optical disc memory (including a compact disc, a laser disc, an optical disc, a digital versatile disc, a Blu-ray disc, and the like), a magnetic disk memory medium or another magnetic storage device, or any other medium that can carry or store expected program code in a form of an instruction or a data structure and can be accessed by a computer, but the present invention is not limited thereto. These memories are connected to the processor by using the bus.

The processor 4011 may be a central processing unit 4011 (Central Processing Unit, CPU for short) or an application-specific integrated circuit (Application-Specific Integrated Circuit, ASIC for short), or is configured as one or more integrated circuits that implement the embodiment of the present invention.

The processor 4011 is configured to invoke the program code in the memory 4012. In a possible implementation manner, when the foregoing application program is executed by the processor 4011, the following functions are implemented.

The receiver 4014 is configured to receive a data scheduling instruction, which is sent by a network device, of a physical downlink control channel, where the data scheduling instruction of the physical downlink control channel includes a preset field, and the preset field includes one or more of a CIF field, an NDI field, and an RBA field.

The processor 4011 is configured to obtain a data retransmission identifier of a first carrier and determine whether the preset field includes the data retransmission identifier of the first carrier.

The receiver 4014 is specifically configured to: when a determining result of the processor 4011 is that the preset field includes the data retransmission identifier of the first carrier, receive data that is on the first carrier on a second carrier according to the data retransmission identifier of the first carrier.

According to the receiving device provided in this embodiment of the present invention, a data scheduling instruction, which is sent by a network device, of a physical downlink control channel is received, whether a preset field includes a data retransmission identifier of a first carrier is determined, and data that is on the first carrier is received on a second carrier according to the data retransmission identifier of the first carrier if the preset field includes the data retransmission identifier of the first carrier, which resolves a problem of excessively high overheads of scheduling signaling of data retransmission in an unlicensed spectrum.

Optionally, in a first application scenario, the preset field includes the CIF field, and the processor 4011 is specifically configured to determine whether the CIF field includes a first index number of the first carrier.

The receiver 4014 is specifically configured to: when a determining result of the processor 4011 is that the CIF field includes the first index number of the first carrier, receive the data that is on the first carrier on the second carrier according to the first index number of the first carrier.

Optionally, the processor 4011 is specifically configured to:

when the preset field includes the CIF field, determine whether the network device may occupy a resource of the first carrier to send data.

The receiving device 1001 may further include a transmitter, and the transmitter is configured to: when a processing result of the processor 4011 is no, receive and detect a scheduling instruction about whether the preset field CIF is sent by using a downlink control channel of the second carrier, where the CIF may be the first index number of the first carrier; or is configured to: when a processing result of the processor 4011 is yes, skip receiving a scheduling instruction about whether the preset field CIF is sent by using a downlink control channel of the second carrier, where the CIF is the first index number of the first carrier, but instead receive and detect scheduling instruction information that is on the first carrier and that is used by the network device to schedule the first carrier to transmit first carrier data to a user device.

The processor 4011 is specifically configured to: when the preset field includes the CIF field, determine whether the network device may occupy a resource of the first carrier to send data.

The receiver 4014 is specifically configured to: when a determining result of the processor 4011 is yes, receive and detect a scheduling instruction about whether the preset field CIF is sent by using a downlink control channel of the second carrier, where the CIF may be the first index number of the first carrier; or when a processing result of the processor 4011 is no, skip receiving a scheduling instruction about whether the preset field CIF is sent by using a downlink control channel of the second carrier, where the CIF is the first index number of the first carrier.

Optionally, in a second application scenario, the preset field includes the NDI field, and the processor 4011 is specifically configured to determine whether the NDI field includes a non-new data identifier.

The receiver 4014 is specifically configured to: when a determining result of the processor 4011 is that the NDI field includes the non-new data identifier, receive the data that is on the first carrier on the second carrier according to the non-new data identifier.

Optionally, in a third application scenario, the preset field includes the RBA field, and the processor 4011 is specifically configured to determine whether the RBA field includes a preset quantity of resource blocks.

The receiver 4014 is specifically configured to: when a determining result of the processor 4011 is that the RBA field includes the preset quantity of resource blocks, receive the data that is on the first carrier on the second carrier according to the preset quantity of resource blocks.

According to the receiving device provided in this embodiment of the present invention, a data scheduling instruction, which is sent by a network device, of a physical downlink control channel is received, whether a preset field includes a data retransmission identifier of a first carrier is determined, and data that is on the first carrier is received on a second carrier according to the data retransmission identifier of the first carrier if the preset field includes the data retransmission identifier of the first carrier, which resolves a problem of excessively high overheads of scheduling signaling of data retransmission in an unlicensed spectrum.

Figure 5:
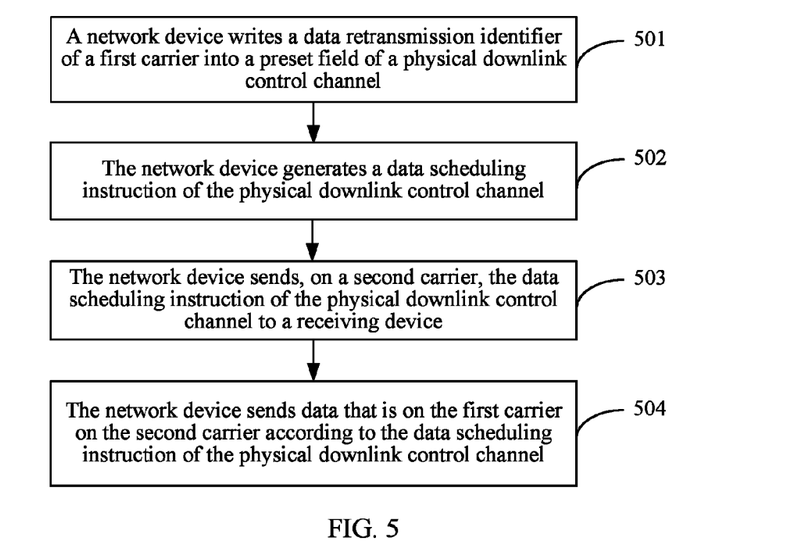
FIG. 5 is a schematic flowchart of an information transmission method according to an embodiment of the present invention.

Based on the embodiment corresponding to FIG. 1, an embodiment of the present invention provides an information transmission method. The method is used by the network device described in the embodiment corresponding to FIG. 1 for data transmission in a preset spectrum, where the preset spectrum is a spectrum that occupies a spectrum resource for a limited time each time. Referring to FIG. 5, the method includes the following steps.

501: A network device writes a data retransmission identifier of a first carrier into a preset field of a physical downlink control channel.

The preset field includes one or more of a CIF field, an NDI field, and an RBA field, and the first carrier is a carrier in the preset spectrum.

Optionally, if the preset field includes the CIF field, a first index number, which is in the CIF field, of the first carrier is used as the data retransmission identifier of the first carrier, where the first index number of the first carrier is used to instruct to retransmit data that is on the first carrier on another carrier, and a second index number of the first carrier is used to instruct to transmit the data that is on the first carrier on the first carrier. Alternatively, the first index number of first carrier and the second index number of the first carrier are equal, and the first index number and the second index number are located at the CIF field of physical downlink control information, so that the data that is on the first carrier may be retransmitted by using a carrier at which a physical downlink control channel carrying the physical downlink control information is located. For example, when a CIF field of control information transmitted on the second carrier includes the first index number of the first carrier, it indicates that the data that is on the first carrier is to be retransmitted on the second carrier. When a CIF field of control information transmitted on the first carrier includes the first index number of the first carrier, or when control information transmitted on the first carrier does not include a CIF field, it indicates that the data of the first carrier is transmitted on the first carrier.

If the preset field includes the NDI field, in the NDI field, a non-new data identifier is used as the data retransmission identifier of the first carrier. The non-new data identifier is used to instruct to retransmit the data that is on the first carrier on another carrier. A new data identifier is used to instruct to transmit the data that is on the first carrier on the first carrier.

If the preset field includes the RBA field, in the RBA field, a preset quantity of resource blocks is used as the data retransmission identifier of the first carrier. Further, optionally, an odd-numbered quantity of resource blocks is used as a preset quantity of resource blocks, that is, if a quantity of resource blocks is an odd number, it indicates that the data that is on the first carrier is to be retransmitted on another carrier; or if a quantity of resource blocks is an even number, it indicates that the data that is on the first carrier is transmitted on the first carrier.

When the preset field includes multiple of the CIF field, the NDI field, and the RBA field, for example, the preset field includes the CIF field and the NDI field. When the CIF field includes the first index number of the first carrier, or when the NDI field includes the non-new data identifier, it indicates that the preset field includes the data retransmission identifier of the first carrier. Therefore, there is double determining for the data retransmission identifier of the first carrier. If there is an error in the CIF field and the data retransmission identifier of the first carrier is not written, the data retransmission identifier of the first carrier can also be determined by using the NDI field, thereby preventing an error in a field from affecting the data retransmission identifier of the first carrier.

Because the spectrum resource of the preset spectrum can be occupied for only a limited time, when transmission of the data of the first carrier is not complete, retransmission needs to be performed for the data of the first carrier. However, a time for occupying the first carrier ends, retransmission of the data that is on the first carrier needs to be performed on another carrier.

502: The network device generates a data scheduling instruction of the physical downlink control channel.

A data scheduling instruction of the physical downlink control channel is used to retransmit the data that is on the first carrier, that is, the data that is on the first carrier is retransmitted on another carrier.

503: The network device sends, on a second carrier, the data scheduling instruction of the physical downlink control channel to a receiving device.

504: The network device sends data that is on the first carrier on the second carrier according to the data scheduling instruction of the physical downlink control channel.

In the prior art, a new field needs to be added to a physical downlink control channel to indicate data retransmission in an unlicensed spectrum. However, according to the information transmission method according to this embodiment of the present invention, instead of adding a new field, a retransmission identifier of a first carrier is added to an existing field, thereby mitigating a problem of excessively high overheads of scheduling signaling of data retransmission in an unlicensed spectrum.

According to the information transmission method provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Figure 6:
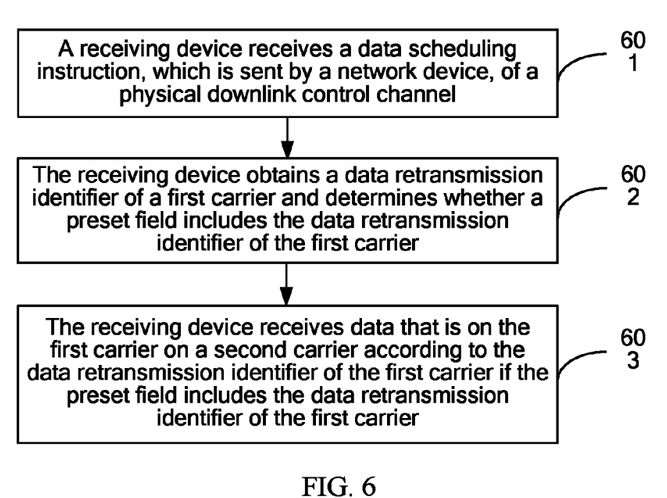
FIG. 6 is a schematic flowchart of another information transmission method according to an embodiment of the present invention.

Based on the embodiment corresponding to FIG. 2, an embodiment of the present invention provides an information transmission method, where the information transmission method is applied to data transmission in a preset spectrum by a receiving device which is described in the embodiment corresponding to FIG. 2, and the preset spectrum is a spectrum that occupies a spectrum resource for a limited time each time. Referring to FIG. 6, the method includes the following steps:

601: A receiving device receives a data scheduling instruction, which is sent by a network device, of a physical downlink control channel.

The data scheduling instruction of the physical downlink control channel includes a preset field, and the preset field includes one or more of a CIF field, an NDI field, and an RBA field.

602: The receiving device obtains a data retransmission identifier of a first carrier and determines whether the preset field includes the data retransmission identifier of the first carrier.

Optionally, the data retransmission identifier of the first carrier may be included in a data scheduling instruction of a physical downlink control channel and sent to the receiving device, or may be preset in the receiving device, so that the receiving device can identify the data retransmission identifier of the first carrier. How to obtain the data retransmission identifier of the first carrier is not limited by the present invention.

603: The receiving device receives data that is on the first carrier on a second carrier according to the data retransmission identifier of the first carrier if the preset field includes the data retransmission identifier of the first carrier.

Specifically, optionally, if the preset field includes the CIF field, a first index number of the first carrier is the data retransmission identifier of the first carrier. Whether the CIF field includes the first index number of the first carrier is determined; and if the CIF field includes the first index number of the first carrier, data that is on the first carrier is received on the second carrier according to the first index number of the first carrier.

If the preset field includes the NDI field, a non-new data identifier is the data retransmission identifier of the first carrier. Whether the NDI field includes the non-new data identifier is determined; and if the NDI field includes the non-new data identifier, data that is on the first carrier is received on the second carrier according to the non-new data identifier.

If the preset field includes the RBA field, a preset quantity of resource blocks is the data retransmission identifier of the first carrier. Whether the RBA field includes the preset quantity of resource blocks is determined; and if a quantity of resource blocks is the preset quantity of resource blocks, data that is on the first carrier is received on the second carrier according to the preset quantity of resource blocks.

In the prior art, a new field needs to be added to a physical downlink control channel to indicate data retransmission in an unlicensed spectrum. However, according to the information transmission method according to this embodiment of the present invention, instead of adding a new field, a retransmission identifier of a first carrier is added to an existing field, thereby mitigating a problem of excessively high overheads of scheduling signaling of data retransmission in an unlicensed spectrum.

According to the information transmission method provided in this embodiment of the present invention, a data scheduling instruction, which is sent by a network device, of a physical downlink control channel is received, whether a preset field includes a data retransmission identifier of a first carrier is determined, and data that is on the first carrier is received on a second carrier according to the data retransmission identifier of the first carrier if the preset field includes the data retransmission identifier of the first carrier, which resolves a problem of excessively high overheads of scheduling signaling of data retransmission in an unlicensed spectrum.

Figure 7:
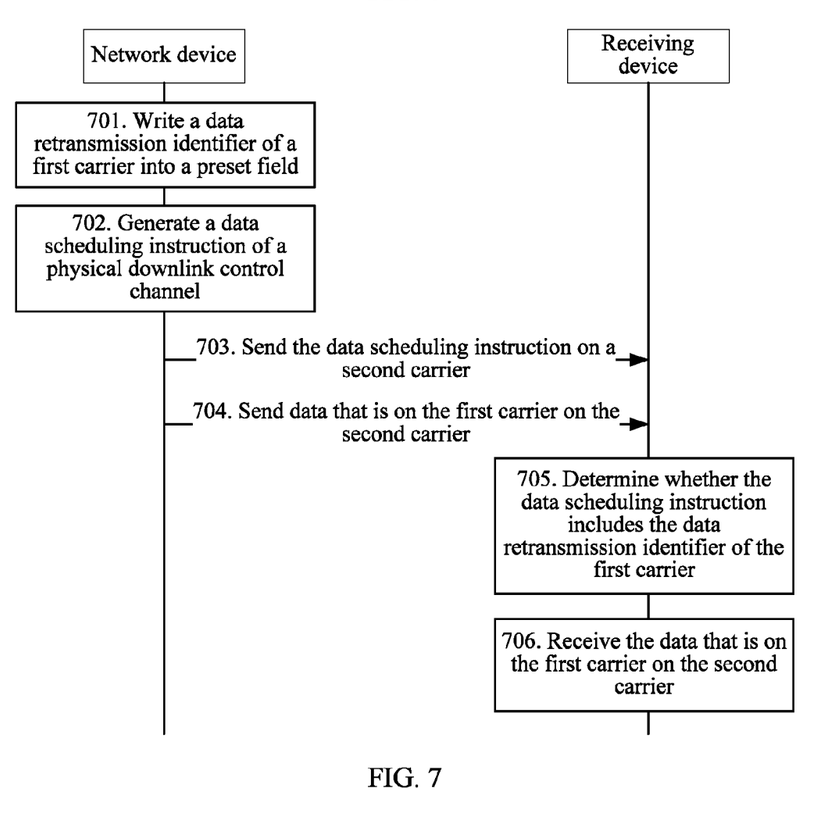
FIG. 7 is a schematic diagram of information exchange according to an embodiment of the present invention.

Based on the embodiments corresponding to FIG. 5 and FIG. 6, another embodiment of the present invention provides an information transmission method, where the information transmission method is applied to data transmission in a preset spectrum, and the preset spectrum is a spectrum that occupies a spectrum resource for a limited time each time. Optionally, in this embodiment, the preset spectrum is an unlicensed spectrum. Certainly, the present invention is not limited to data transmission in an unlicensed spectrum. Referring to FIG. 7, the method includes the following steps:

701: A network device writes a data retransmission identifier of a first carrier into a preset field of a physical downlink control channel.

The physical downlink control channel may be a PDCCH (Physical Downlink Control Channel, physical downlink control channel) or an EPDCCH (Enhanced Physical Downlink Control Channel, enhanced physical downlink control channel), and a specific form of the physical downlink control channel is not limited in the present invention.

Optionally, the preset field includes one or more of a CIF field, an NDI field, and an RBA field. Herein, only a field including a data retransmission identifier of a first carrier is used as the preset field. In cases in which the CIF field, the NDI field, and the RBA field are not used as the preset fields, the CIF field, the NDI field, and the RBA field also have original functions of the CIF field, the NDI field, and the RBA field. Specifically, optionally, this embodiment provides three solutions to describe in detail how to instruct to retransmit data that is on the first carrier on a second carrier when the CIF field, the NDI field, and the RBA field are separately used as the preset field.

Solution 1

The preset field includes the CIF field, and a first index number of the first carrier is used as the data retransmission identifier of the first carrier. Specifically, each carrier may be provided with two index numbers, for example, index numbers "0000" and "0001". The first index number "0000" is used to instruct to transmit data that is on the carrier on another carrier, and the second index number "0001" is used to instruct to transmit data that is on the carrier on the carrier. With reference to step 703, a data scheduling instruction is sent on the second carrier. If the CIF field includes a first index number of the first carrier, it indicates that the data that is on the first carrier is to be retransmitted on the second carrier. If the CIF field includes a second index number of the first carrier, it indicates that the data that is on the first carrier is transmitted on the first carrier, and only the data scheduling instruction is sent by using the second carrier, that is, cross-carrier scheduling.

It should be especially noted that, when the first index number is equal to the second index number, the data that is on the first carrier may be retransmitted by using the second carrier at which the physical downlink control channel is located. The data is indicated by transmission of control information on the second carrier, where the CIF field included in the control information is the first index number of the first carrier. In other words, by using a carrier at which a downlink control channel including the CIF field is located, a base station may instruct UE to transmit data of another carrier on the carrier. Information in the CIF field is a first index number of the another carrier. For example, a first index number and a second index number of the first carrier are both "0001". If downlink control information indicated by the preset field CIF is sent in the downlink control channel of the second carrier, and the CIF indicator is "0001", it indicates that data that needs to be retransmitted and that is on the first carrier is to be transmitted on the second carrier. If downlink control information indicated by the preset field CIF is sent in the downlink control channel of the first carrier, and the CIF indicator is "0001" or downlink control information that does not include the preset field CIF is sent in the downlink control channel of the first carrier, it indicates that data that needs to be retransmitted and that is on the first carrier is transmitted on the first carrier.

Solution 2

The preset field includes the NDI field, and the non-new data identifier is used as the data retransmission identifier of the first carrier. In this case, the CIF field has an original function. The CIF field includes the index number of the first carrier, which represents that data needing to be transmitted is the data that is on the first carrier. The non-new data identifier is used to instruct to transmit the data that is on the first carrier on another carrier. A new data identifier is used to instruct to transmit the data that is on the first carrier on the first carrier. Optionally, "0" may be used as the new data identifier, and "1" may be used as the non-new data identifier. With reference to step 703, the data scheduling instruction is sent on the second carrier. If the NDI field includes the non-new data identifier, it indicates that the data that is on the first carrier is to be retransmitted on the second carrier. If the NDI field includes the new data identifier, it indicates that the data that is on the first carrier is transmitted on the first carrier, and only the data scheduling instruction is sent by using the second carrier, that is, cross-carrier scheduling. It should be noted that, if the physical downlink control channel has multiple NDI fields, the preset field may be one or more of the multiple NDI fields.

Solution 3

The preset field includes the RBA field, and a preset quantity of resource blocks is used as the data retransmission identifier of the first carrier. Optionally, if the quantity of resource blocks is an odd number, it indicates that the data that is on the first carrier is to be retransmitted on another carrier; or if the quantity of resource blocks is an even number, it indicates that the data that is on the first carrier is transmitted on the first carrier. Alternatively, if the quantity of resource blocks is an even number, it indicates that the data that is on the first carrier is to be retransmitted on another carrier; or if the quantity of resource blocks is an odd number, it indicates that the data that is on the first carrier is transmitted on the first carrier. The preset quantity of resource blocks is not limited in this embodiment and can be autonomously set according to a specific case as long as receiving and sending parties both can identify the preset quantity of resource blocks. In this embodiment, an example in which an odd-numbered quantity of resource blocks is used as the data retransmission identifier of the first carrier is used for description. With reference to step 703, the data scheduling instruction is sent on the second carrier. If the quantity of resource blocks is an odd number, it indicates that the data that is on the first carrier is to be retransmitted on the second carrier; or if the quantity of the resource block is an even number, it indicates that the data that is on the first carrier is transmitted on the first carrier, and only the data scheduling instruction is sent by using the second carrier, that is, cross-carrier scheduling.

When the preset field includes multiple of the CIF field, the NDI field, and the RBA field, for example, the preset field includes the CIF field and the NDI field. When the CIF field includes the first index number of the first carrier, or when the NDI field includes the non-new data identifier, it indicates that the preset field includes the data retransmission identifier of the first carrier. Therefore, there is double determining for the data retransmission identifier of the first carrier. If there is an error in the CIF field and the data retransmission identifier of the first carrier is not written, the data retransmission identifier of the first carrier can also be determined by using the NDI field, thereby preventing an error in a field from affecting the data retransmission identifier of the first carrier.

702: The network device generates a data scheduling instruction of the physical downlink control channel.

A data scheduling instruction of the physical downlink control channel is used to instruct to retransmit the data that is on the first carrier, that is, to retransmit the data that is on the first carrier on another carrier.

703: The network device sends, on a second carrier, the data scheduling instruction of the physical downlink control channel to a receiving device.

If the preset field includes the CIF field, the network device determines whether a resource of the first carrier may be occupied to send data. If not, the network device sends the preset field CIF by using the physical downlink control channel of the second carrier. It should be especially noted that, downlink control information that the CIF is the first index number of the first carrier is merely an example in the present invention, and the present invention includes, but is not limited to, the example. Alternatively, if yes, the network device does not send downlink control information that the preset field CIF is the first index number of the first carrier by using the physical downlink control channel of the second carrier.

If the preset field includes the CIF field, the network device determines whether a resource of the second carrier may be occupied to send data. If yes, the network device sends the preset field CIF by using the physical downlink control channel of the second carrier. It should be especially noted that, downlink control information that the CIF may be the first index number of the first carrier is merely an example in the present invention, and the present invention includes, but is not limited to, the example. Alternatively, if not, the network device does not send downlink control information that the preset field CIF is the first index number of the first carrier by using the physical downlink control channel of the second carrier.

Optionally, the network device may be a station, and the receiving device may be user equipment.

704: The network device sends data that is on the first carrier on a second carrier according to the data scheduling instruction of the physical downlink control channel.

705: The receiving device determines whether a preset field of the data scheduling instruction includes the data retransmission identifier of the first carrier.

With reference to step 701, correspondingly, the receiving device may determine whether a preset field includes the data retransmission identifier of the first carrier by using a same method. Optionally, the data retransmission identifier of the first carrier may be included in the data scheduling instruction of the physical downlink control channel in step 703 and sent to the receiving device, or may be preset in the receiving device, so that the receiving device can identify the data retransmission identifier of the first carrier. How to obtain the data retransmission identifier of the first carrier is not limited in the present invention.

If the preset field includes the CIF field, the receiving device learns whether the network device may occupy a resource of the first carrier to send data. If not, the user equipment detects a scheduling instruction about whether the preset field CIF is sent by using the downlink control channel of the second carrier, where the CIF may be the first index number of the first carrier. If yes, the user equipment does not detect the scheduling instruction about whether the preset field CIF is sent by using the downlink control channel of the second carrier, where the CIF is the first index number of the first carrier, but detects scheduling instruction information that is on the first carrier and that is used by the network device to schedule the first carrier to transmit data of the first carrier to user equipment.

If the preset field includes the CIF field, the receiving device learns whether the network device may occupy a resource of the first carrier to send data. If yes, the user equipment detects whether the preset field CIF is sent by using the downlink control channel of the second carrier, where the CIF is a scheduling instruction of the first index number of the first carrier; or if not, the user equipment does not detect whether a scheduling instruction that the preset field CIF is a first index number of the first carrier is sent by using the downlink control channel of the second carrier.

706: If the preset field includes the data retransmission identifier of the first carrier, the receiving device receives the data that is on the first carrier on the second carrier according to the data retransmission identifier of the first carrier.

With reference to step 701, after determining, the receiving device receives the data on a corresponding carrier.

In the prior art, a new field needs to be added to a physical downlink control channel to indicate data retransmission in an unlicensed spectrum. However, according to the information transmission method according to this embodiment of the present invention, instead of adding a new field, a retransmission identifier of a first carrier is added to an existing field, thereby mitigating a problem of excessively high overheads of scheduling signaling of data retransmission in an unlicensed spectrum.

According to the information transmission method provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

Figure 8:
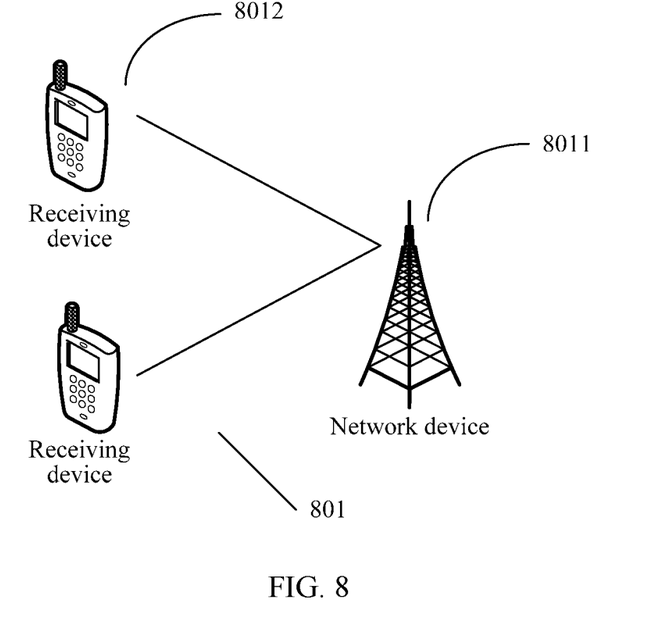
FIG. 8 is a schematic structural diagram of a wireless communications system according to an embodiment of the present invention.

An embodiment of the present invention provides a wireless communications system, where the wireless communications system is applied to data transmission in a preset spectrum, and the preset spectrum is a spectrum that occupies a spectrum resource for a limited time each time. Optionally, the preset spectrum in this embodiment may be an unlicensed spectrum. Referring to FIG. 8, the wireless communications system 801 includes at least one network device 8011 and at least one receiving device 8012.

The network device 8011 is the network device described in the embodiment corresponding to FIG. 1, and the receiving device 8012 is the receiving device described in the embodiment corresponding to FIG. 2.

Alternatively, the network device 8011 is the network device described in the embodiment corresponding to FIG. 3, and the receiving device 8012 is the receiving device described in the embodiment corresponding to FIG. 4.

Optionally, the network device 8011 may be a base station, and the receiving device 8012 may be user equipment.

According to the wireless communications system provided in this embodiment of the present invention, a data retransmission identifier of a first carrier is written into a preset field of a physical downlink control channel, a data scheduling instruction of the physical downlink control channel is generated, the data scheduling instruction of the physical downlink control channel is sent, on a second carrier, to a receiving device, and data that is on the first carrier is sent on the second carrier according to the data scheduling instruction of the physical downlink control channel, which resolves a problem of excessively high overheads of scheduling signaling of data retransmission in an unlicensed spectrum.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer memory medium and a communications medium, where the communications medium includes any medium that enables a computer program to be transmitted from one place to another. The memory medium may be any available medium accessible to a computer. The following provides an example but does not impose a limitation: The computer-readable medium may include a RAM (Random Access Memory), a ROM (Read-Only Memory), an EEPROM (Electrically Erasable Programmable Read-Only Memory), a CD-ROM (Compact Disc Read-Only Memory) or other optical disc memory, a disk memory medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a CD (Compact Disc), a laser disc, an optical disc, a DVD (Digital Versatile Disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network device, wherein the network device is applied to data transmission in a preset spectrum, the preset spectrum is a spectrum that occupies a spectrum resource for a limited time each time, and the network device comprises: a processor, a memory, a bus, and a transmitter, wherein the processor, the memory, and the transmitter are connected to each other by using the bus;
   the processor is configured to write a data retransmission identifier of a first carrier into a preset field of a physical downlink control channel, wherein the preset field comprises one or more of a carrier indicator (CIF) field, a new data indicator (NDI) field, and a resource block assignment (RBA) field, and the first carrier is a carrier in the preset spectrum;
   the processor is further configured to generate a data scheduling instruction of the physical downlink control channel, wherein the data scheduling instruction of the physical downlink control channel is used to instruct to retransmit data that is on the first carrier;
   the transmitter is configured to send, on a second carrier, the data scheduling instruction of the physical downlink control channel to a receiving device; and
   the transmitter is further configured to send the data that is on the first carrier on the second carrier according to the data scheduling instruction of the physical downlink control channel.

2. The device according to claim 1, wherein
the processor is specifically configured to: when the preset field comprises the CIF field, use a first index number of the first carrier as the data retransmission identifier of the first carrier and write the first index number of the first carrier into the CIF field, wherein the first index number of the first carrier is used to instruct to retransmit the data of the first carrier on the second carrier.

3. The device according to claim 1, wherein
the processor is specifically configured to: when the preset field comprises the NDI field, use a non-new data identifier as the data retransmission identifier of the first carrier and write the non-new data identifier into the NDI field, wherein the non-new data identifier is used to instruct to retransmit the data of the first carrier on the second carrier.

4. The device according to claim 1, wherein
the processor is specifically configured to: when the preset field comprises the RBA field, use a preset quantity of resource blocks as the data retransmission identifier of the first carrier and write the preset quantity of resource blocks into the RBA field, wherein the preset quantity of resource blocks is used to instruct to retransmit the data of the first carrier on the second carrier.

5. A receiving device, wherein the receiving device is applied to data transmission in a preset spectrum, the preset spectrum is a spectrum that occupies a spectrum resource for a limited time each time, and the receiving device comprises: a processor, a memory, a bus, and a receiver, wherein the processor, the memory, and the receiver are connected to each other by using the bus;
   the receiver is configured to receive a data scheduling instruction, which is sent by a network device, of a physical downlink control channel, wherein the data scheduling instruction of the physical downlink control channel comprises a preset field, and the preset field comprises one or more of a carrier indicator (CIF) field, a new data indicator (NDI) field, and a resource block assignment (RBA) field;
   the processor is configured to obtain a data retransmission identifier of a first carrier and determine whether the preset field comprises the data retransmission identifier of the first carrier; and
   the receiver is further configured to: when a determining result of the processor is that the preset field comprises the data retransmission identifier of the first carrier, receive data that is on the first carrier on a second carrier according to the data retransmission identifier of the first carrier.

6. The device according to claim 5, wherein
the processor is specifically configured to: when the preset field comprises the CIF field, determine whether the CIF field comprises a first index number of the first carrier; and
the receiver is specifically configured to: when a determining result of the processor is that the CIF field comprises the first index number of the first carrier, receive the data that is on the first carrier on the second carrier according to the first index number of the first carrier.

7. The device according to claim 5, wherein
the processor is specifically configured to: when the preset field comprises the NDI field, determine whether the NDI field comprises a non-new data identifier; and
the receiver is specifically configured to: when a determining result of the processor is that the NDI field comprises the non-new data identifier, receive the data that is on the first carrier on the second carrier according to the non-new data identifier.

8. The device according to claim 5, wherein
the processor is specifically configured to: when the preset field comprises the RBA field, determine whether the RBA field comprises a preset quantity of resource blocks; and
the receiver is specifically configured to: when a determining result of the processor is that the RBA field comprises the preset quantity of resource blocks, receive the data that is on the first carrier on the second carrier according to the preset quantity of resource blocks.

9. An information transmission method, wherein the information transmission method is applied to data transmission by a network device in a preset spectrum, the preset spectrum is a spectrum that occupies a spectrum resource for a limited time each time, and the information transmission method comprises:
   writing, by the network device, a data retransmission identifier of a first carrier into a preset field of a physical downlink control channel, wherein the preset field comprises one or more of a carrier indicator (CIF) field, a new data indicator (NDI) field, and a resource block assignment (RBA) field, and the first carrier is a carrier in the preset spectrum;

generating, by the network device, a data scheduling instruction of the physical downlink control channel, wherein the data scheduling instruction of the physical downlink control channel is used to instruct to retransmit data that is on the first carrier;

sending, by the network device on a second carrier, the data scheduling instruction of the physical downlink control channel to a receiving device; and sending, by the network device, the data that is on the first carrier on the second carrier according to the data scheduling instruction of the physical downlink control channel.

10. The method according to claim 9, wherein the preset field comprises the CIF field; and the writing, by the network device, a data retransmission identifier of a first carrier into a preset field of a physical downlink control channel comprises:

using, by the network device, a first index number of the first carrier as the data retransmission identifier of the first carrier and writing the first index number of the first carrier into the CIF field, wherein the first index number of the first carrier is used to instruct to retransmit the data of the first carrier on the second carrier.

11. The method according to claim 9, wherein the preset field comprises the NDI field; and the writing, by the network device, a data retransmission identifier of a first carrier into a preset field of a physical downlink control channel comprises:

using, by the network device, a non-new data identifier as the data retransmission identifier of the first carrier and writing the non-new data identifier into the NDI field, wherein the non-new data identifier is used to instruct to retransmit the data of the first carrier on the second carrier.

12. The method according to claim 9, wherein the preset field comprises the RBA field; and the writing, by the network device, a data retransmission identifier of a first carrier into a preset field of a physical downlink control channel comprises:

using, by the network device, a preset quantity of resource blocks as the data retransmission identifier of the first carrier and writing the preset quantity of resource blocks into the RBA field, wherein the preset quantity of resource blocks is used to instruct to retransmit the data of the first carrier on the second carrier.

13. An information transmission method, wherein the information transmission method is applied to data transmission by a receiving device in a preset spectrum, the preset spectrum is a spectrum that occupies a spectrum resource for a limited time each time, and the information transmission method comprises:

receiving, by the receiving device, a data scheduling instruction, which is sent by the network device, of a physical downlink control channel, wherein the data scheduling instruction of the physical downlink control channel comprises a preset field, and the preset field comprises one or more of a carrier indicator (CIF) field, a new data indicator (NDI) field, and a resource block assignment (RBA) field;

obtaining, by the receiving device, a data retransmission identifier of a first carrier and determining whether the preset field comprises the data retransmission identifier of the first carrier; and receiving, by the receiving device, data that is on the first carrier on a second carrier according to the data retransmission identifier of the first carrier if the preset field comprises the data retransmission identifier of the first carrier.

14. The method according to claim 13, wherein the preset field comprises the CIF field;

the determining, by the receiving device, whether the preset field comprises the data retransmission identifier of the first carrier comprises:

determining, by the receiving device, whether the CIF field comprises a first index number of the first carrier; and the receiving, by the receiving device, data that is on the first carrier on a second carrier according to the data retransmission identifier of the first carrier if the preset field comprises the data retransmission identifier of the first carrier comprises:

if the CIF field comprises the first index number of the first carrier, receiving, by the receiving device, the data that is on the first carrier on the second carrier according to the first index number of the first carrier.

15. The method according to claim 13, wherein the preset field comprises the NDI field;

the determining, by the receiving device, whether the preset field comprises the data retransmission identifier of the first carrier comprises:

determining, by the receiving device, whether the NDI field comprises a non-new data identifier; and the receiving, by the receiving device, data that is on the first carrier on a second carrier according to the data retransmission identifier of the first carrier if the preset field comprises the data retransmission identifier of the first carrier comprises:

if the NDI field comprises the non-new data identifier, receiving, by the receiving device, the data that is on the first carrier on the second carrier according to the non-new data identifier.

16. The method according to claim 13, wherein the preset field comprises the RBA field;

the determining, by the receiving device, whether the preset field comprises the data retransmission identifier of the first carrier comprises:

determining, by the receiving device, whether the RBA field comprises a preset quantity of resource blocks; and the receiving, by the receiving device, data that is on the first carrier on a second carrier according to the data retransmission identifier of the first carrier if the preset field comprises the data retransmission identifier of the first carrier comprises:

if the RBA field comprises the preset quantity of resource blocks, receiving, by the receiving device, the data that is on the first carrier on the second carrier according to the preset quantity of resource blocks.

* * * * *

UNITED STATES PATENT AND TRADEMARK OFFICE
CERTIFICATE OF CORRECTION

PATENT NO. : 9,999,070 B2
APPLICATION NO. : 15/274832
DATED : June 12, 2018
INVENTOR(S) : Yan et al.

Page 1 of 1

It is certified that error appears in the above-identified patent and that said Letters Patent is hereby corrected as shown below:

On the Title Page

Page 2, Column 2, Line 9, Item (56), References Cited, Foreign Patent Documents, "WO WO 2013087835 A1," should read -- WO 2013087835 A1 --.

Signed and Sealed this
Fourth Day of September, 2018

Andrei Iancu
*Director of the United States Patent and Trademark Office*